United States Patent
Darrow, Jr. et al.

(10) Patent No.: US 7,621,480 B2
(45) Date of Patent: Nov. 24, 2009

(54) DE-ROTATION SYSTEM FOR A COUNTER-ROTATING, COAXIAL ROTOR HUB SHAFT FAIRING

(75) Inventors: David A. Darrow, Jr., Stratford, CT (US); Fabio P. Bertolotti, South Windsor, CT (US); Thomas L. Sbabo, Hamden, CT (US); Frank P. D'Anna, Seymour, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 11/432,875

(22) Filed: May 12, 2006

(65) Prior Publication Data

US 2007/0181741 A1    Aug. 9, 2007

Related U.S. Application Data

(60) Provisional application No. 60/776,278, filed on Feb. 23, 2006, provisional application No. 60/693,592, filed on Jun. 24, 2005, provisional application No. 60/684,694, filed on May 26, 2005.

(51) Int. Cl.
    *B64C 27/00* (2006.01)
(52) U.S. Cl. .................. 244/17.19; 244/17.27; 244/130; 416/41; 416/124; 416/179; 416/244 R
(58) Field of Classification Search .............. 244/17.19, 244/17.23, 17.27, 130; 416/33, 41, 124, 416/179, 244 R
    See application file for complete search history.

(56) References Cited

U.S. PATENT DOCUMENTS

| 2,323,786 A | 7/1943 | Beisel |
| 2,328,786 A | 9/1943 | Crowder |
| 2,397,632 A | 4/1946 | Stuart |
| 3,149,803 A | 9/1964 | Petrides et al. |
| 3,894,703 A | 7/1975 | Velasquez |
| 4,022,546 A | 5/1977 | Drees et al. |
| 4,053,258 A | 10/1977 | Mouille |
| 4,123,018 A | 10/1978 | Tassin de Montaigu |
| 4,212,588 A | 7/1980 | Fradenburgh |
| 4,478,379 A | 10/1984 | Kerr |
| 4,566,856 A | 1/1986 | Miller |
| 4,580,944 A | 4/1986 | Miller |
| 4,809,931 A | 3/1989 | Mouille et al. |
| 5,251,847 A | 10/1993 | Guimbal |

(Continued)

OTHER PUBLICATIONS

Title: Summary of Rotor Hub Drag Data; By G.N. Keys and H.J. Rosenstein; Dated: Mar. 1978.

(Continued)

*Primary Examiner*—J. Woodrow Eldred
(74) *Attorney, Agent, or Firm*—Carlson Gaskey & Olds

(57) ABSTRACT

A rotor hub fairing system includes an upper hub fairing, a lower hub fairing and a shaft fairing therebetween. The rotor hub fairing system is attached to the counter-rotating, coaxial rotor system through a bearing arrangement such that the shaft fairing may be positioned at an azimuthal position about the main rotor axis of rotation relative the airframe by a de-rotation system. The de-rotation system controls the position of the shaft fairing about the axis of rotation such that the shaft fairing is prevented from rotating freely in unison with either shaft as may otherwise result during some flight regimes.

7 Claims, 10 Drawing Sheets

U.S. PATENT DOCUMENTS

| | | | |
|---|---|---|---|
| 5,289,994 | A | 3/1994 | Del Campo Aguilera |
| 5,364,230 | A | 11/1994 | Krauss et al. |
| 5,415,364 | A | 5/1995 | Grant |
| 5,588,618 | A | 12/1996 | Marze et al. |
| 5,727,754 | A | 3/1998 | Carter, Jr. |
| 5,885,059 | A | 3/1999 | Kovalsky et al. |
| 5,954,480 | A | 9/1999 | Schmaling et al. |
| 6,189,475 | B1 | 2/2001 | Coakley |
| 7,083,142 | B2 | 8/2006 | Scott |
| 7,229,251 | B2 | 6/2007 | Bertolotti et al. |
| 7,270,520 | B2 | 9/2007 | Sudre et al. |
| 2005/0254903 | A1 | 11/2005 | Mc Millian et al. |

OTHER PUBLICATIONS

Title: Experimental Investigation of Advanced Hub and Pylon Fairing Configurations to Reduce Helicopter Drag; By: D.M. Martin, R.W. Mort, L.A. Young, P.K. Squires; Dated: Sep. 1993, NASA Technical Memorandum 4540.

Title: The First 50 Years Were Fine . . . But What Should We Do for an Encore?—The 1994 Alexander A. Nikolsky Lecture; By: Evan A. Fradenburgh; Journal of the American Helicopter Society; Jan. 1995.

Title: Rotorcraft Hub Shroud; By: LTC Chip Lunn; Brannon Industries; Apr. 11, 2006.

PCT International Search Report and written opinion mailed Aug. 19, 2008 for PCT/US06/20349.

DE-ROTATION SYSTEM FOR A COUNTER-ROTATING, COAXIAL ROTOR HUB SHAFT FAIRING

The present application claims priority to U.S. Provisional Patent Application Ser. Nos. 60/693,592, filed Jun. 24, 2005; 60/684,694, filed May 26, 2005; and 60/776,278, filed Feb. 23, 2006.

BACKGROUND OF THE INVENTION

The present invention is directed to a rotor hub fairing system for a rotary-wing aircraft having a counter-rotating, coaxial rotor system, and more particularly, to a de-rotation system which rotationally stabilizes a shaft fairing mounted between an upper hub fairing and a lower hub fairing.

Typically, the aerodynamic drag associated with a rotor hub on a rotary wing aircraft is a significant portion of the overall aircraft drag, typically 25% to 30% for conventional single-rotor helicopters. The rotor system drag increases for a rotary wing aircraft having a counter-rotating, coaxial rotor system primarily due to the dual rotor hubs and the interconnecting shaft therebetween. For high-speed rotary wing aircraft, the increased drag resulting from the counter-rotating, coaxial rotor system may result in a relatively significant power penalty.

The aerodynamic drag of the dual counter-rotating, coaxial rotor system is generated by three main components—the upper rotor hub assembly, the lower rotor hub assembly, and the interconnecting main rotor shaft assembly. The drag contribution may be approximately 40% for each of the hubs, and 20% for the interconnecting main rotor shaft assembly. Typically, a rotor hub fairing arrangement is mounted to each of the upper rotor hub and the lower rotor hub such that overall drag on the rotorcraft is reduced. The interconnecting main rotor shaft between the upper rotor hub assembly and the lower rotor hub assembly, however, is typically exposed.

For a variety of reasons including, but not limited to, reduced drag and low observability, contoured shaft fairings have been developed to cover the exposed interconnecting main rotor shaft.

The shaft fairing is mounted to the counter-rotating, coaxial rotor system within a completely rotational environment between the upper hub fairing and the lower hub fairing through a bearing arrangement such that the shaft fairing is aligned with the fuselage in forward flight but is free to align with the relative wind during low speed maneuvering.

During forward flight, airflow stabilizes the shaft fairing on the bearing arrangement relative the rotating interconnecting main rotor shaft. During hover and low speed maneuvers, however, frictional forces acting on the bearing arrangement may tend to cause the shaft fairing to undesirably rotate in unison with the main rotor system. Rotation of the shaft fairing may increase drag and reduce the low-observability benefits of the contoured shaft fairing.

Accordingly, it is desirable to provide a de-rotation system for a shaft fairing within the completely rotational environment between an upper rotor hub fairing and a lower rotor hub fairing of a counter-rotating, coaxial rotor hub fairing system.

SUMMARY OF THE INVENTION

A rotor hub fairing system for a dual, counter-rotating, coaxial rotor system according to the present invention generally includes an upper hub fairing, a lower hub fairing and a shaft fairing located therebetween. The rotor hub fairing system is attached to the counter-rotating, coaxial rotor system through a bearing arrangement such that the shaft fairing may be rotationally positioned at an azimuthal position about a main rotor axis of rotation relative the airframe by a de-rotation system. The de-rotation system controls the position of the shaft fairing about the axis of rotation such that the shaft fairing is prevented from rotating freely in unison with either rotor shaft as may otherwise result.

One de-rotation system includes a belt driven system which self-aligns whenever the aircraft reaches a forward flight speed at which the airflow force is greater than the friction force between the belts and pulleys of the de-rotation system. This permits the de-rotation system to be designed for lower loads and thereby provides a light weight system.

Another de-rotation system includes an upper plate, a lower plate, a drive cone assembly and a stationary support ring assembly. The upper plate rotates with one rotor shaft while the lower plate rotates with the other rotor shaft. The drive cone assembly includes a multitude of shaft-mounted beveled cones which mate between the upper and lower plates. A shaft extends radially outward from each beveled cone and is mounted to a stationary support ring of the stationary support ring assembly. The stationary support ring assembly supports the shaft fairing and may be manufactured as a C-section split ring to facilitate disassembly for maintenance checks.

Another de-rotation system may additionally be operated in response to a control system through which the azimuthal position of the shaft fairing can be actively varied throughout all flight profiles. The de-rotation system generally includes a variable torque generator system, a controller in communication with the variable torque generator system and a shaft fairing position sensor in communication with the controller. The de-rotation system may also communicate with a flight control system to selectively azimuthally position the shaft fairing relative the airframe throughout all flight profiles to, for example, increase the maneuverability of the aircraft.

The present invention therefore provide a de-rotation system for a shaft fairing within the completely rotational environment between an upper rotor hub fairing and a lower rotor hub fairing of a counter-rotating, coaxial rotor hub fairing system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
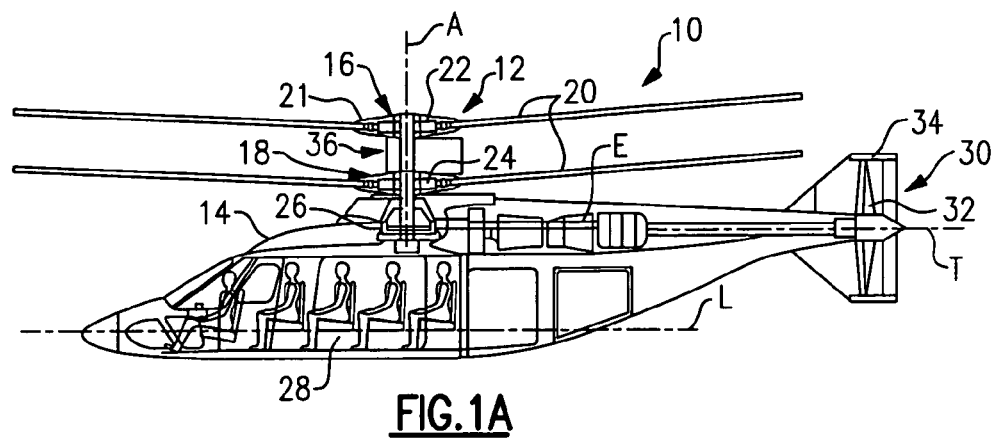
FIGS. 1A and 1B are general schematic views of an exemplary rotary wing aircraft embodiment for use with the present invention.
Figure 1B:
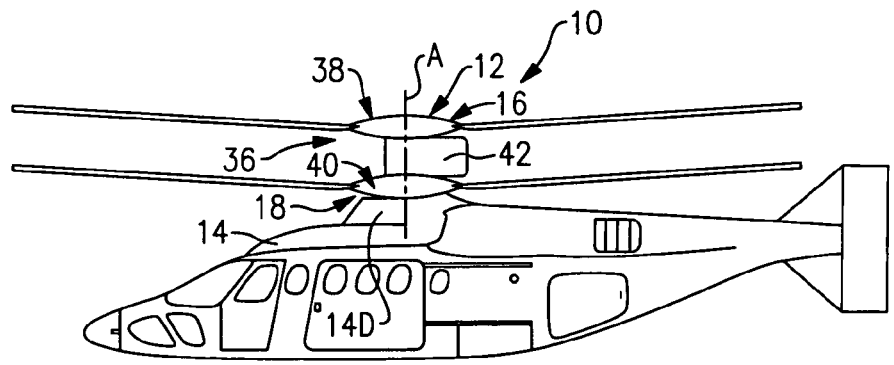

FIGS. 1A and 1B illustrate an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis L. Although a particular aircraft configuration is illustrated in the disclosed embodiment, other counter-rotating, coaxial rotor systems will also benefit from the present invention.

The dual, counter-rotating, coaxial rotor system 12 includes an upper rotor system 16 and a lower rotor system 18. Each rotor system 16, 18 includes a plurality of rotor blades 20 mounted to a rotor hub 22, 24 for rotation about a rotor axis of rotation A. A plurality of the main rotor blades 20 project substantially radially outward from the hub assemblies 22, 24 and are connected thereto in any manner known to one of ordinary skill in the art (schematically illustrated at 21). Any number of blades 20 may be used with the rotor system 12.

A main gearbox 26 which may be located above the aircraft cabin 28 drives the rotor system 12. The translational thrust system 30 may be driven by the same main gearbox 26 which drives the rotor system 12. The main gearbox 26 is driven by one or more engines (illustrated schematically at E). As shown, the gearbox 26 may be interposed between the gas turbine engines E, the rotor system 12 and the translational thrust system 30.

The translational thrust system 30 may be mounted to the rear of the airframe 14 with a rotational axis T oriented substantially horizontal and parallel to the aircraft longitudinal axis L to provide thrust for high-speed flight. Preferably, the translational thrust system 30 includes a pusher propeller 32 mounted within an aerodynamic cowling 34.

Referring to FIG. 1B, the rotor system 12 includes a rotor hub fairing system 36, preferably an integrated rotor hub fairing system, generally located between and around the upper and lower rotor systems 16, 18 such that the rotor hubs 22, 24 are at least partially contained therein. The rotor hub fairing system 36 achieves a significant drag reduction in which large-scale flow separation is greatly reduced.

The rotor hub fairing system 36 generally includes an upper hub fairing 38, a lower hub fairing 40 and a shaft fairing 42 therebetween. Preferably, the rotor hub fairing system 36 is integrated to reduce interference effects between the separate fairings 38, 40, 42 and eliminate excessive separation in the junction areas. The term "integrated" as utilized herein means that the shaft fairing 42 generally follows the contours of the upper hub fairing 38 and the lower hub fairing 40 at the rotational interfaces therebetween. Furthermore, the lower hub fairing 40 is preferably integrated with the airframe 14 in an area typically referred to on a rotorcraft as a pylon 14D. It should be understood that fairing systems of various configurations will be usable with the present invention. For further understanding of other aspects of the rotor hub fairing system and associated components thereof, attention is directed to U.S. patent application Ser. No. 11/141,246, filed May 31, 2005, which is assigned to the assignee of the instant invention and which is hereby incorporated herein in its entirety.

Figure 1C:
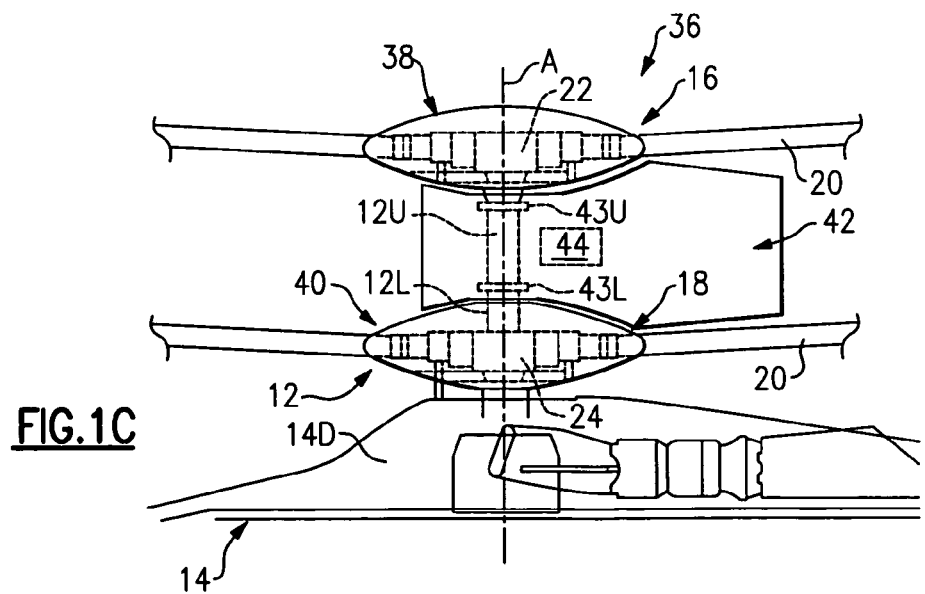
FIG. 1C is an expanded partial phantom view of a counter-rotating coaxial rotor system mounting a rotor hub fairing system according to the present invention.

Referring to FIG. 1C, the shaft fairing 42 is preferably attached to the counter-rotating, coaxial rotor system 12 through a bearing arrangement 43U, 43L (illustrated schematically) such that the shaft fairing 42 may be positioned at a relative angular position about the axis of rotation A relative the airframe 14 by a de-rotation system 44. The upper bearing 43U and the lower bearing 43L may be respectively located adjacent an upper portion and a lower portion of the shaft fairing 42. The upper bearing 43U is preferably attached to one rotor shaft 12U while the lower bearing 43L attached to the other rotor shaft 12L such that the bearings are counter rotating and the net bearing drag is relatively low.

The de-rotation system 44 controls the position of the shaft fairing 42 about the axis of rotation A such that the shaft fairing 42 is prevented from rotating freely in unison with either shaft 12U, 12L as may otherwise result during some flight regimes. Although the present invention is described in connection with a particular helicopter embodiment, it should be readily appreciated that other areas which require a stationary mount in a rotating environment will also benefit from the present invention.

Figure 2A:
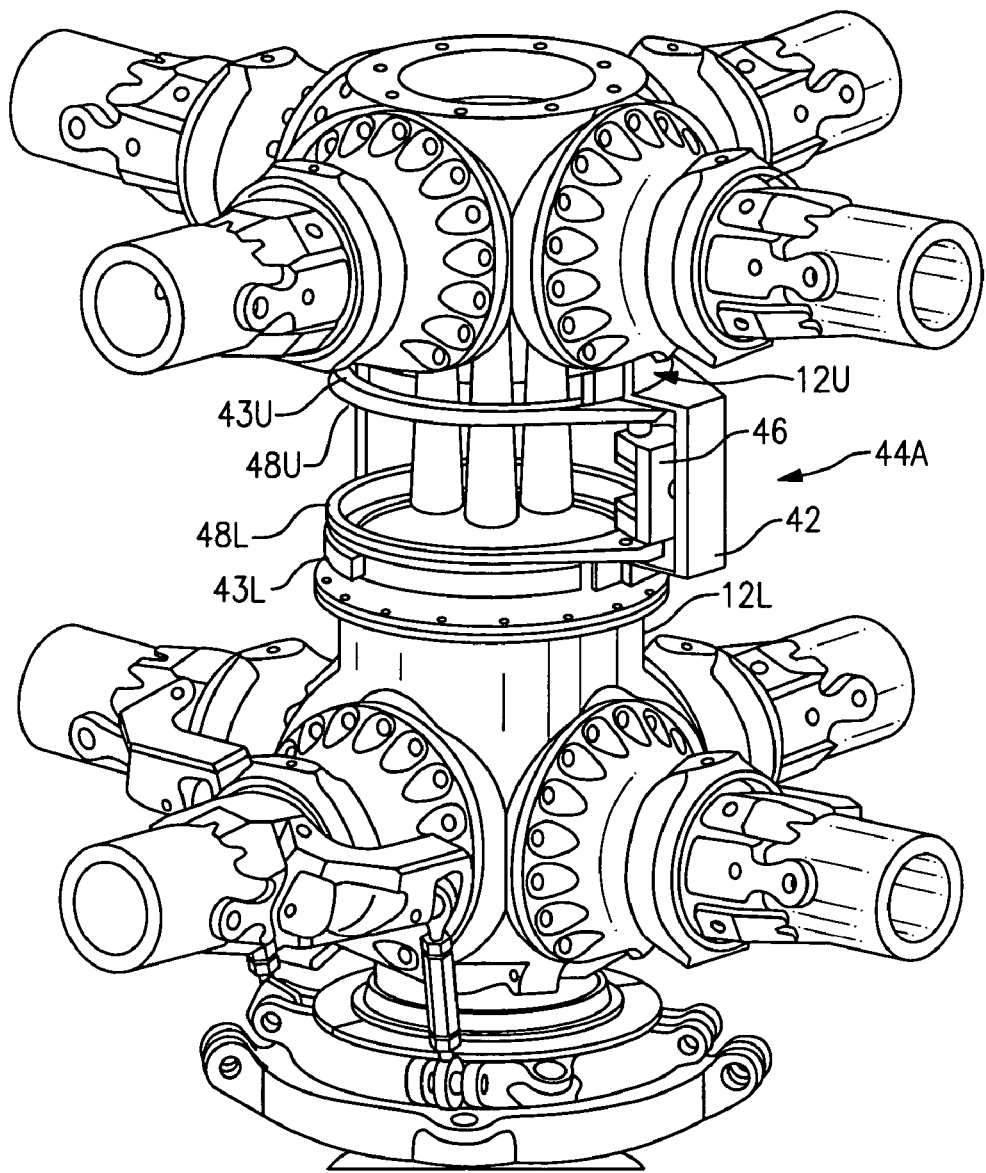
FIG. 2A is a perspective partial phantom view of a counter-rotating coaxial rotor system illustrating a de-rotation system contained within a shaft fairing.

Referring to FIG. 2A, the de-rotation system 44A includes a gear train 46 to at least partially nullify rotation of the shaft fairing 42 which may otherwise occur due to parasitic friction of the bearing arrangement 43U, 43L. An upper belt 48U and a lower belt 48L engage the gear train 46 which are driven in equal but opposite directions about the axis of rotation. The upper belt 48U rotates with the rotor shaft 12U as the upper belt 48U is in engagement with an upper belt drive member 50U fixed for rotation with rotor shaft 12U.

Figure 2B:
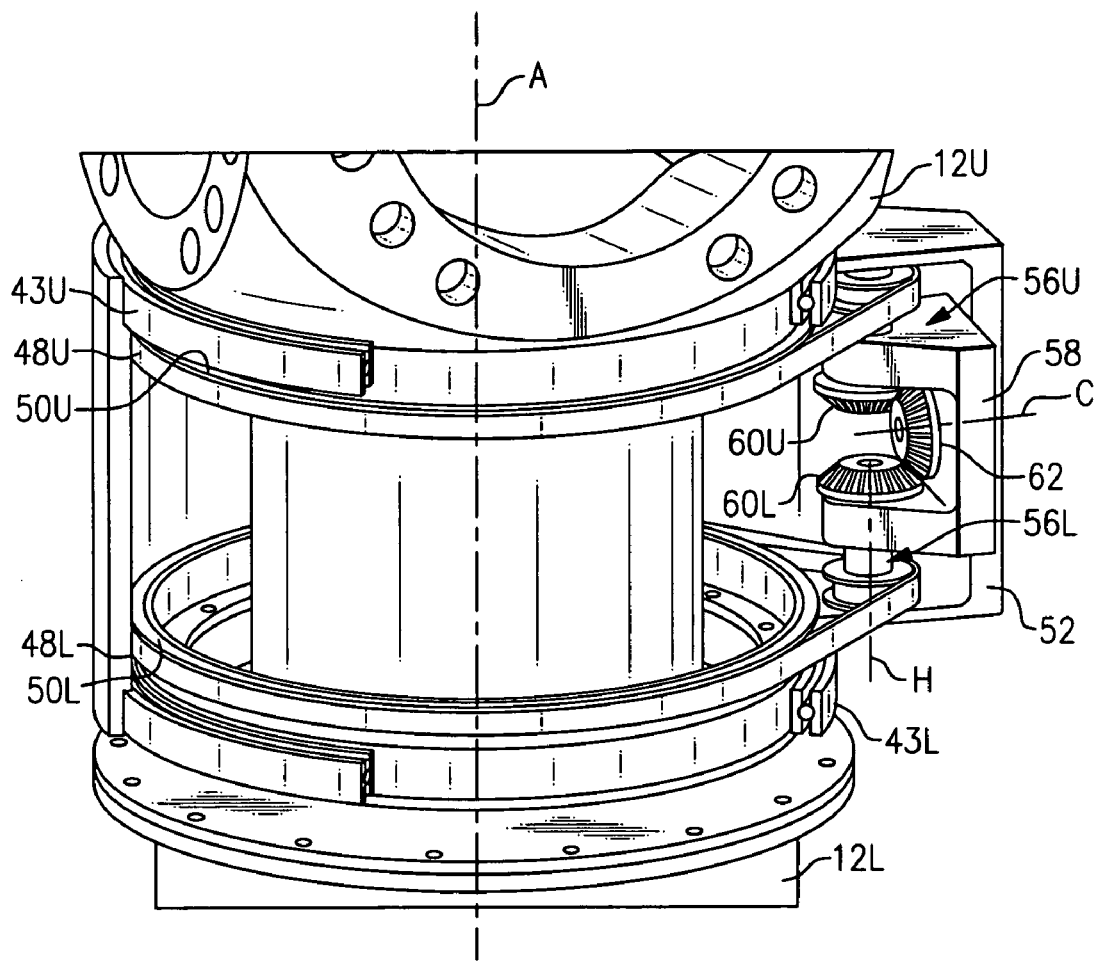
FIG. 2B is an expanded sectional view of the de-rotation system illustrated in FIG. 2A.

Referring to FIG. 2B, the lower belt 48L rotates with the rotor shaft 12L as the lower belt 48L is in engagement with a lower belt drive member 50L fixed for rotation with rotor shaft 12L. Preferably, the upper belt 48U and the lower belt 48L are V-shaped belts or toothed belts, however, other members may alternatively be utilized. Furthermore, it should be understood that although the term "belt" is utilized herein, other members may likewise be utilized.

Figure 2C:
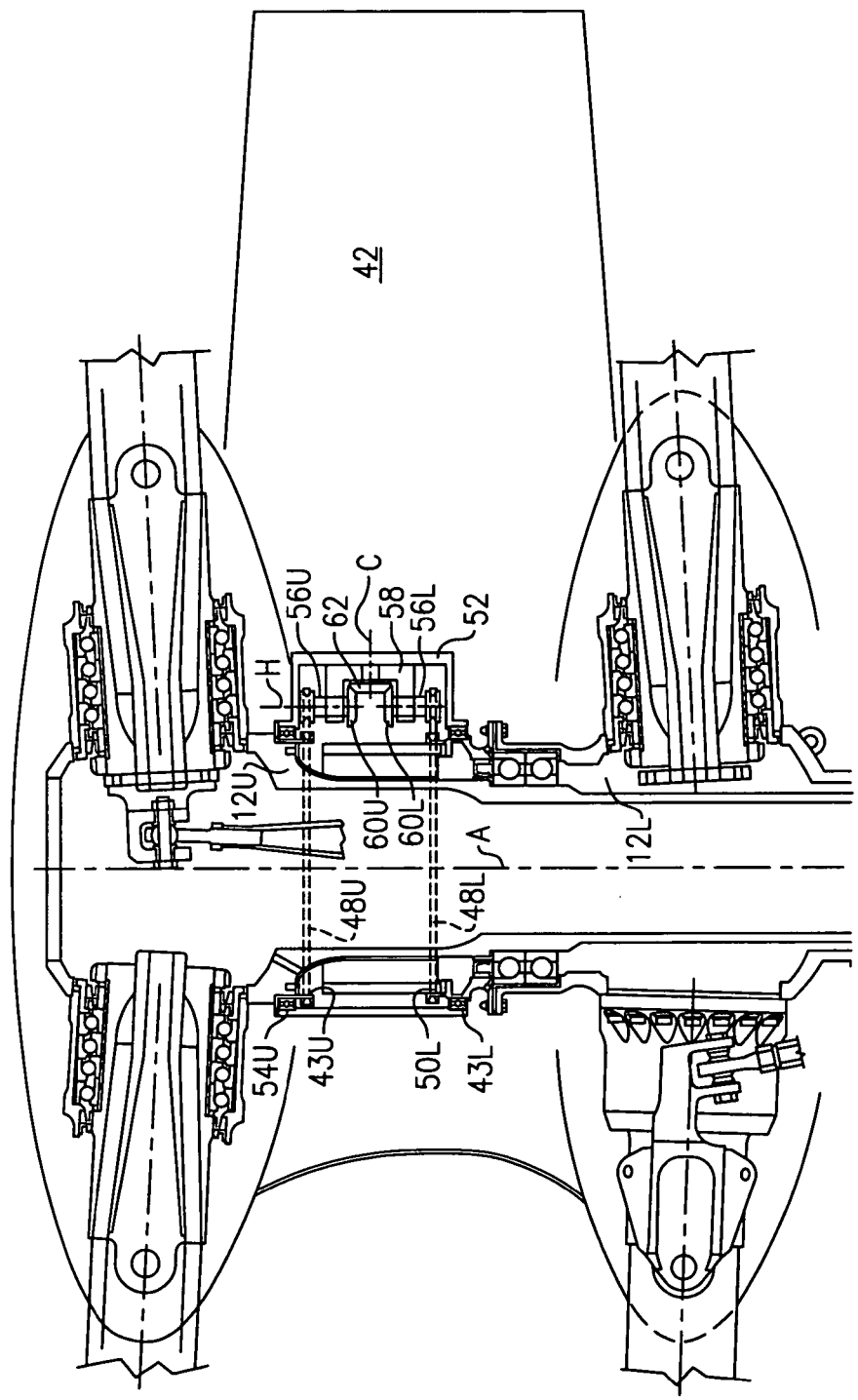
FIG. 2C is a sectional view of the de-rotation system of FIG. 2A taken through the rotor system axis of rotation.

The gear train 46 is mounted within a housing 52 located within the shaft fairing 42. The housing 50 is preferably attached to the inside of the shaft fairing 42 such that the essentially stationary housing 50 maintains the shaft fairing 42 essentially stationary with respect to the airframe 10. The housing 52 is preferably attached to the counter-rotating, coaxial rotor system 12 through the bearing arrangement 43U, 43L (FIG. 2C) such that the housing 50 rotates with the shaft fairing 42 about the axis of rotation A. The upper bearing 43U and the lower bearing 43L are respectively located adjacent an upper portion and a lower portion of the housing 52.

The upper bearing 43U is attached to one rotor shaft 12U while the lower housing bearing 43L is attached to the other rotor shaft 12L such that the bearings counter rotate and the net bearing drag is relatively low.

The gear train 46 preferably includes an upper and lower shaft-mounted pulley 56U, 56L which rotate about an axis of rotation H. The upper and lower shaft-mounted pulley 56U, 56L are mounted within a housing support 58. The upper and lower shaft-mounted pulley 56U, 56L mount a respective bevel gear 60U, 60L. The bevel gears 60U, 60L are in meshing engagement with a common idler gear 62. The common idler gear 62 rotates about an axis of rotation C which is transverse to the axis of rotation H. Since both bevel gears 60U, 60L have an equivalent number of teeth, the common idler gear 62 rotates about axis C but maintains an azimuthal position relative to the axis of rotation A such that the shaft fairing 42 maintains an azimuthal position relative to the aircraft 10.

As the de-rotation system 44A is belt driven, the de-rotation system 44A is self-correcting whenever the aircraft reaches a forward flight speed at which the force applied by airflow is greater than the friction force between the belts 48U and pulleys 56U, 56L. That is, should the shaft fairing 42 become misaligned, the forward flight speed at which the force applied by airflow is greater than the friction force between the belts 48U and pulleys 56U, 56L will realign the shaft fairing 42 with the longitudinal axis of aircraft 10. This permits the de-rotation system 44 to be designed for lower loads and thereby provides a light weight system.

Furthermore, it should be understood that the frictional force may be set relatively low such that even low speed maneuvering such as side-slip maneuvers above a predefined velocity will also align the shaft faring 42 to a relative wind direction.

Figure 3A:
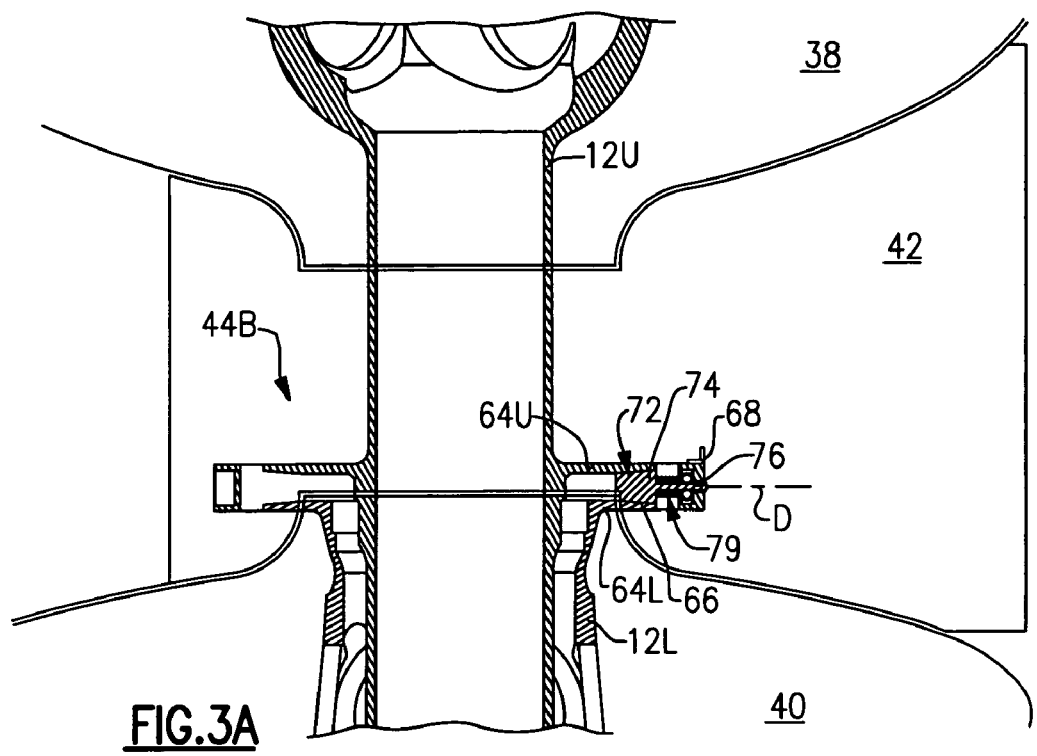
FIG. 3A is a side partial sectional view of another de-rotation system.

Referring to FIG. 3A, another de-rotation system 44B at least partially nullifies rotation of the shaft fairing 42 which may otherwise occur due to parasitic friction of the bearing arrangement 43U, 43L. The de-rotation system 44B generally includes an upper plate 64U, a lower plate 64L, a drive cone assembly 66 and a stationary support ring assembly 68.

Figure 3B:
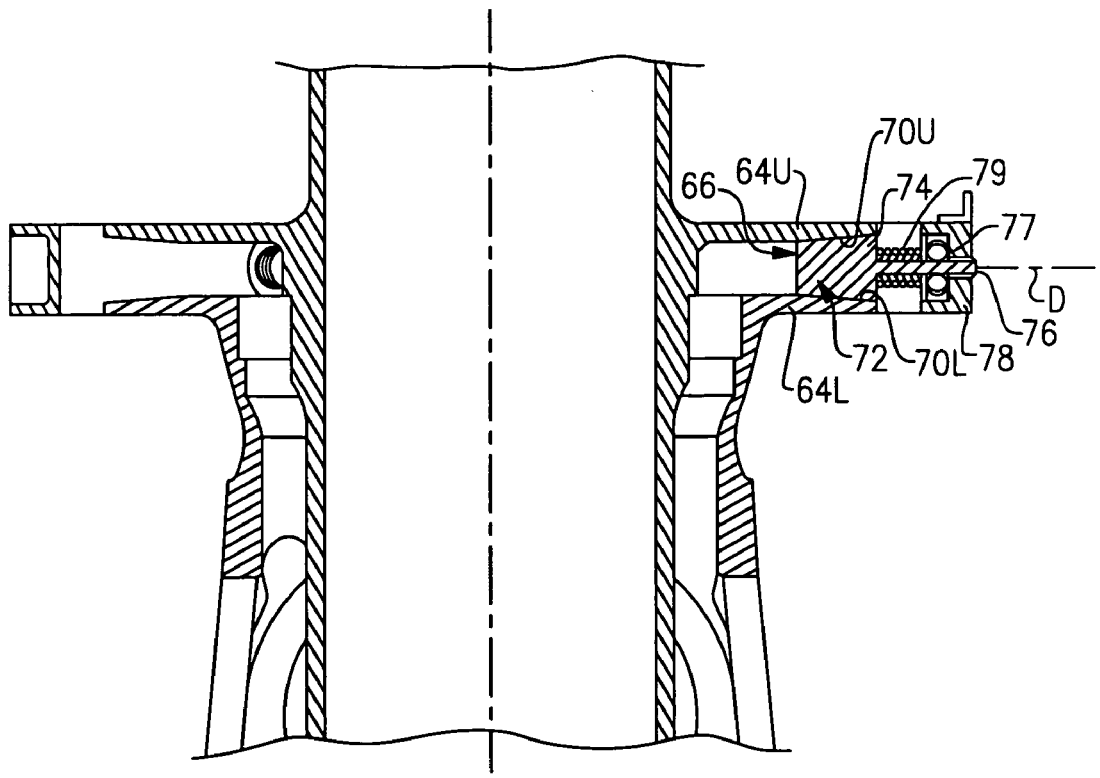
FIG. 3B is an expanded side partial sectional view of the de-rotation system of FIG. 3A.

The upper plate 64U rotates with the rotor shaft 12U as the upper plate 64U is fixed for rotation with rotor shaft 12U. The lower plate 64L rotates with the rotor shaft 12L as the lower plate 64L is fixed for rotation with rotor shaft 12L. The upper plate 64U and the lower plate 64L are concentric with the axis of rotation A and each include a respective beveled surface 70U, 70L which faces the opposite beveled surface 70L, 70U (also illustrated in FIG. 3B).

Figure 3C:
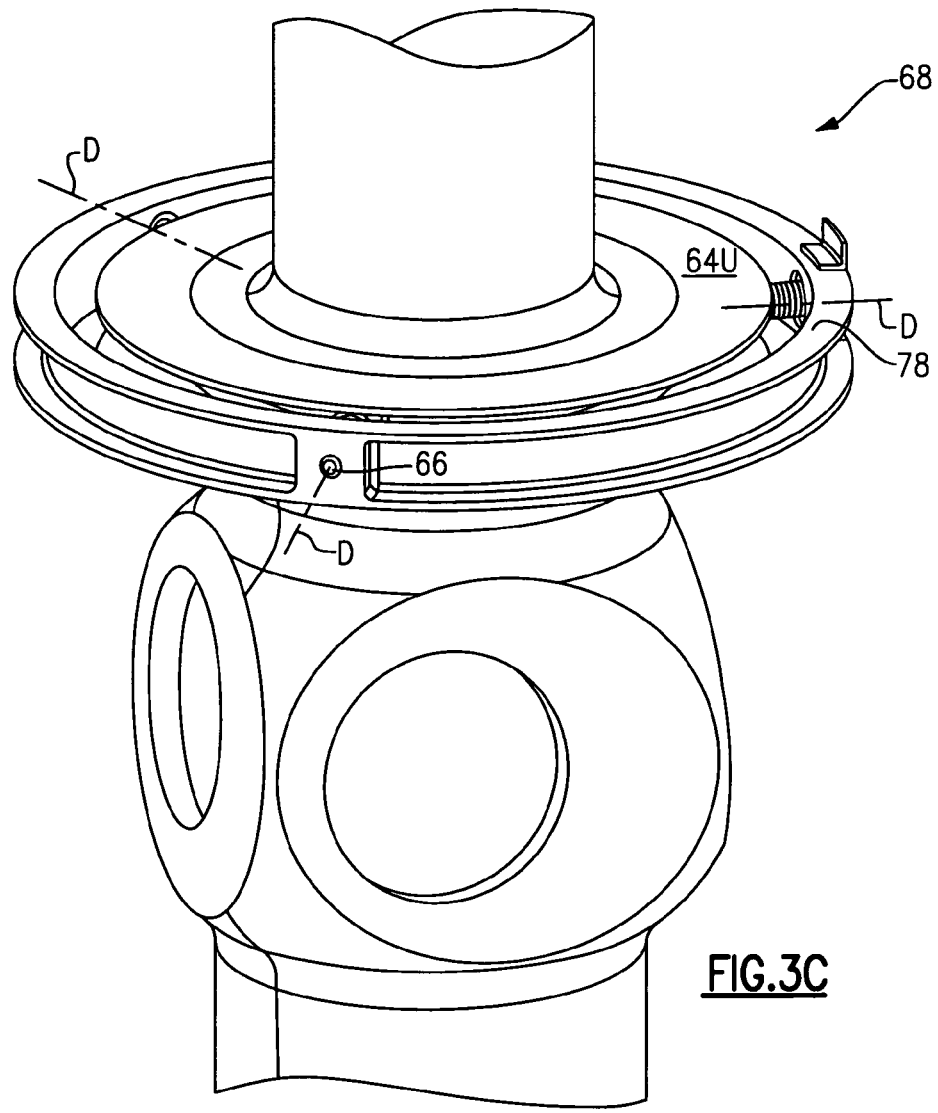
FIG. 3C is a side perspective view of the de-rotation system of FIG. 3A.
Figure 3E:
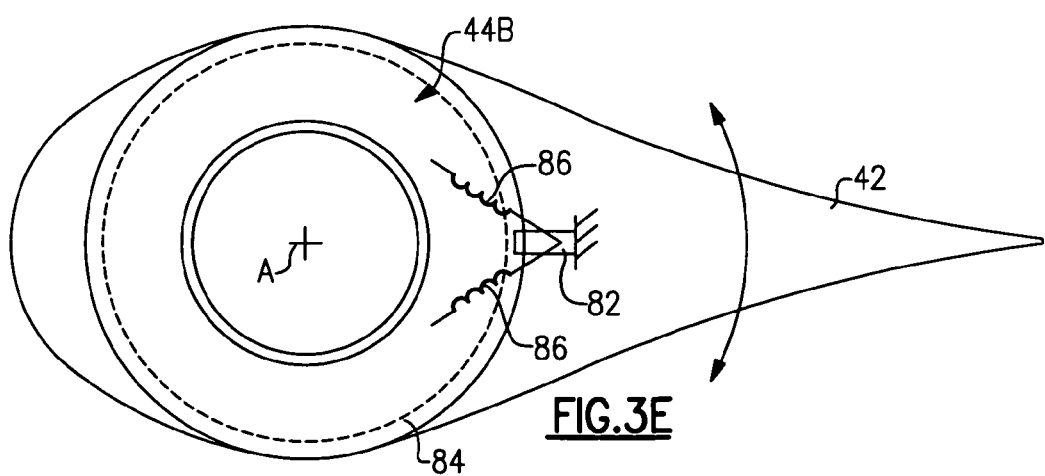
FIG. 3E is a top schematic view of the de-rotation system of FIG. 3A.
Figure 3D:
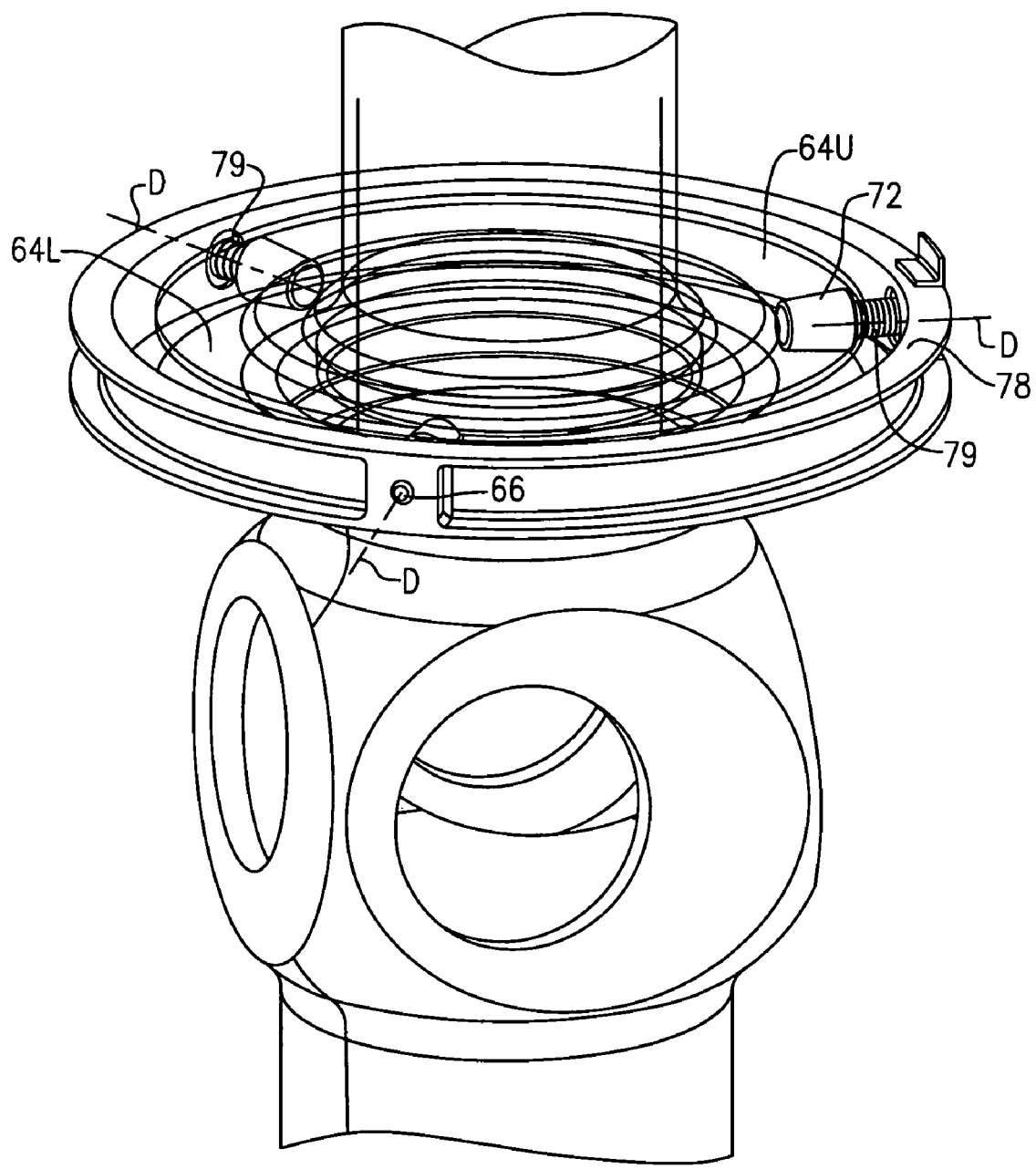
FIG. 3D is a side partial phantom perspective view of the de-rotation system of FIG. 3A.

The drive cone assembly 66 includes a multitude of shaft-mounted beveled cones 72 (FIGS. 3C and 3D). That is, each shaft-mounted beveled cone 72 includes a frustro-conical member 74 which mates with and fits between the beveled surfaces 70U, 70L. The beveled cones 72 are preferably constructed with an exterior elastomeric surface having a high coefficient of friction while the beveled surface 70U, 70L includes a roughened contacting surface conducive to a high coefficient of friction.

Although a friction drive with an elastomer is applied to the beveled cones 72 and the beveled surface 70U, 70L provides the roughened mating surface, it should be understood that the elastomer coating may alternatively be applied to the beveled surface 70U, 70L and the beveled cones 72 could be prepared with the roughened surface. It should be further understood that various friction drive materials and interfaces therebetween may alternatively or additionally be utilized with the present invention. Furthermore, even though the present invention is described using a friction drive method due to its light weight, ease of manufacture, and low load requirement, it should be understood that a gear mesh, such as a bevel gear or a face gear mesh may alternatively be substituted for the friction drive for applications requiring higher load capacities.

A shaft 76 extends radially outward from each beveled cone 72 and is mounted to a stationary support ring 78 of the stationary support ring assembly 68 for rotation about an axis of rotation D.

The stationary support ring assembly 78 is preferably manufactured as a C-section split ring (FIG. 3C) to facilitate disassembly for maintenance checks. The stationary support ring assembly 78 preferably includes a drive cone bearing 77 (FIG. 3C) to support each shaft 76 to facilitate rotation and alignment of each shaft-mounted beveled cone 72 about the respective axis of rotation D. A cone biasing member 79 (FIG. 3D) such as a coil spring are preferably located between the rotating race of the drive cone bearing 77 and the outboard vertical flat of the beveled cone 72 to preload the beveled cone 72 toward the drive plate 64U, 64L.

The drive cone assembly 66 and drive plates 64U, 64L are sized and configured so that rotation of rotor shaft 12L causes the drive cone assembly 66 to rotate about their respective axis D (FIG. 3C), however since the rotor shaft 12U is rotating at substantially the same speed as rotor shaft 12L but in an opposite direction, the azimuthal location of each shaft-mounted bevel cone 72 remains substantially stationary with respect to the airframe 10. That is, since each shaft-mounted beveled cone 72 is free to rotate in place about each drive cone axis D but essentially prevented from azimuthal movement the rotor shaft axis of rotation A, the support ring assembly 68 which is affixed thereto, is essentially rotationally stationary with respect to the airframe 10 (FIG. 3A).

The shaft fairing 42 is mounted to the stationary support ring assembly 68 such that the shaft fairing 42 remains essentially stationary with respect to the airframe 10. That is, the shaft fairing 42 is prevented from rotating in unison with the rotor shaft by affixing the shaft fairing 42 to the stationary support ring assembly 68.

The shaft fairing is preferably mounted to the stationary support ring assembly 68 by a bias assembly 80 (FIG. 3E). The bias assembly 80 is preferably an alignment member 82 fixed to the shaft fairing 42 and located within an annular groove 84 of the stationary support ring 78 such that the shaft fairing 42 may rotate about the stationary support ring 78 as limited by centering springs 86 located between the stationary support ring 78 and the and the shaft fairing 42. It should be understood that the alignment member 82 may take various forms which essentially define an outer race relative the stationary support ring 78. The bias assembly 80 permits the shaft fairing 42 to at least partially align with relative airflow in sideward flight, lowering the loads on the de-rotation system 44B while maintaining the shaft fairing 42 in a centered position during hover.

Figure 4A:
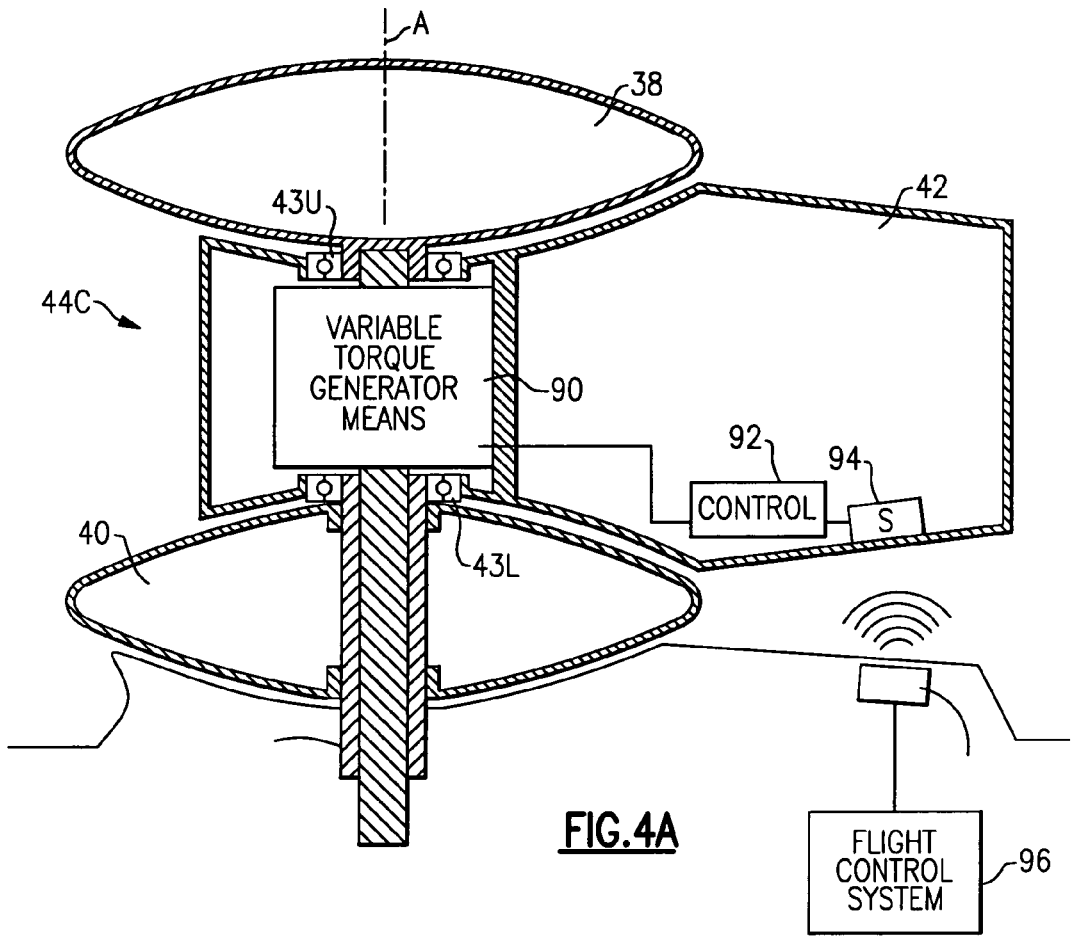
FIG. 4A is a schematic sectional view through the rotor system axis of rotation illustrating an active de-rotation system.

Referring to FIG. 4A, another de-rotation system 44C at least partially nullifies rotation of the shaft fairing 42 which may otherwise occur due to parasitic friction of the bearing arrangement 43U, 43L. The de-rotation system 44C, in addition to de-rotation of the shaft fairing as described above, may additionally be operated in response to a control system through which the azimuthal position of the shaft fairing 42 may be actively varied throughout all flight profiles.

The de-rotation system 44C generally includes a variable torque generator system 90, a controller 92 in communication with the variable torque generator system 90 and a shaft fairing position sensor 94 in communication with the controller 92. The de-rotation system 44C preferably communicates with a flight control system 96 to selectively azimuthally position the shaft fairing 42 relative the airframe 14 throughout all flight profiles.

Figure 4B:
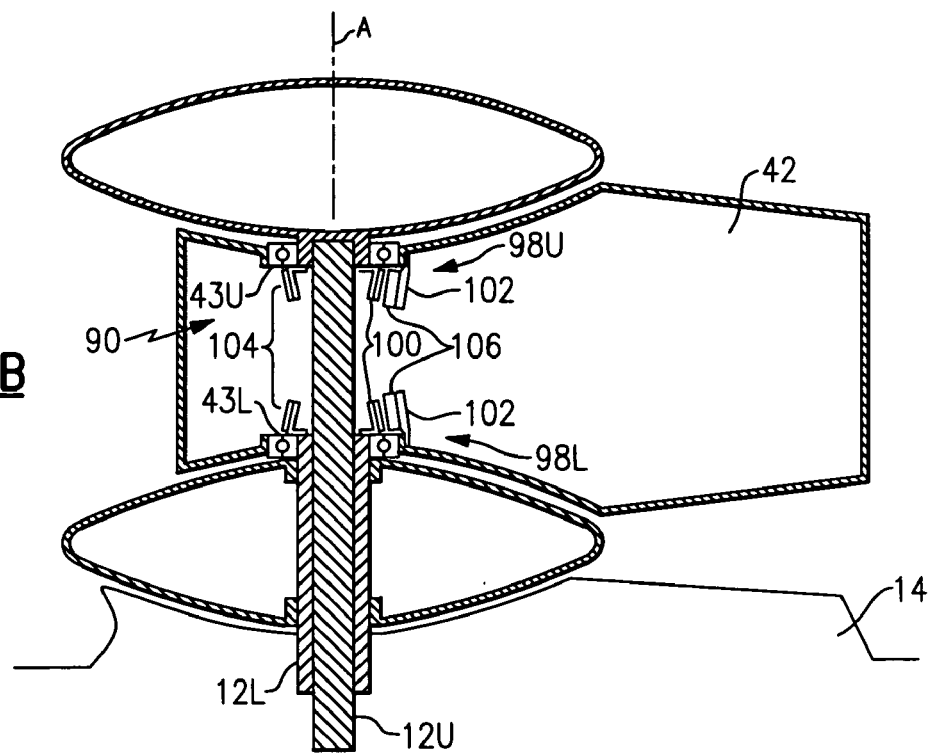
FIG. 4B is a sectional view of an active de-rotation system illustrating a variable torque generator system.
Figure 4C:
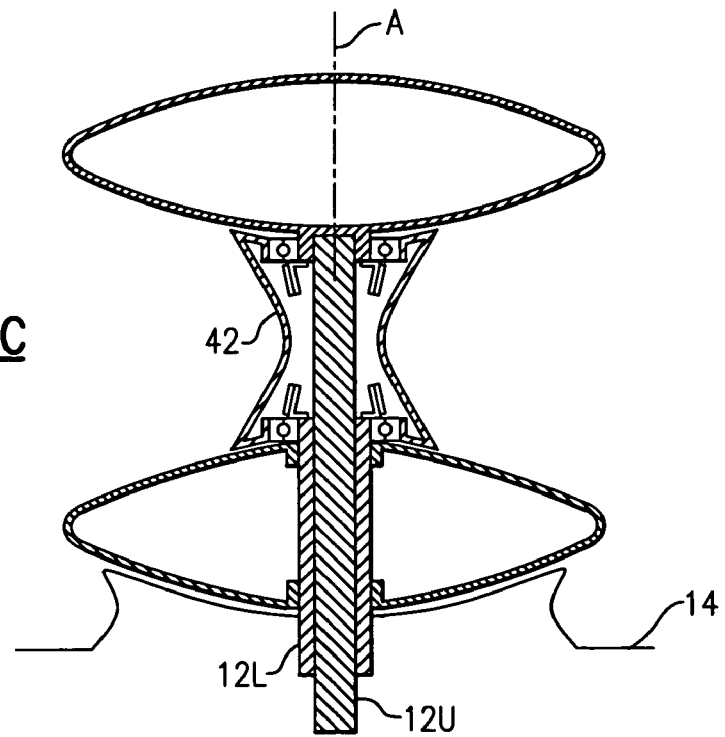
FIG. 4C is a front sectional view of the active de-rotation system illustrating a frustro conical electromagnetic torque generator accommodated within an hour glass shaped shaft fairing.

Referring to FIG. 4B, the variable torque generator system 90 preferably includes an upper electromagnetic torque generator 98U mounted with respect to the rotor shaft 12U and a lower electromagnetic torque generator 98L mounted with respect to the rotor shaft 12L. Each electromagnetic torque generator 98U, 98L can be build with a predetermined amount of coning, so as to accommodated shaft fairing geometries that exhibit a "necking", or "hour-glass" shape (FIG. 4C). Each electromagnetic torque generator 98U, 98L is mounted to the respective bearing arrangement 43U, 43L. The bearing arrangement 43U, 43L are preferred supports because of the inherent strength and precise machining typical of bearing construction.

Figure 4D:
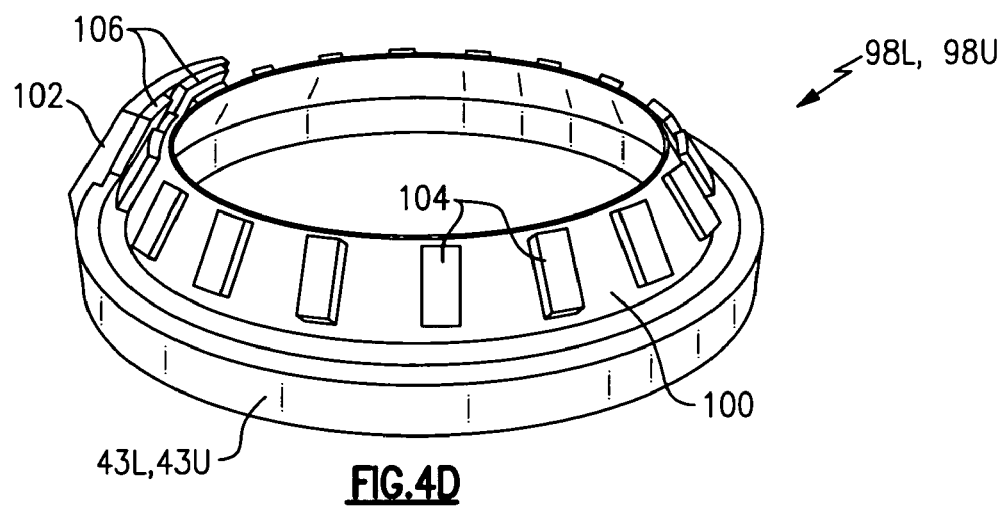
FIG. 4D is a partial perspective view of one electromagnetic torque generator.

Each electromagnetic torque generator 98U, 98L includes an inner support structure 100 which rotates with the respective rotor shaft 12U, 12L and an outer support structure 102 mounted to the shaft fairing 42 such that the inner support structure 100 rotates relative the outer support structure 102. Each inner support structure 100 supports a multitude of permanent magnets 104 which form an azimuthally distributed pattern (FIG. 4D). The outer support structure 102 supports an electromagnetic stator structure 106 which includes one or more coils that receive magnetic-flux excitation stimulation from the relative rotation between the permanent magnets 104 and the electromagnetic stator structure 106. The magnetic shear developed between the permanent magnets 104 and the electromagnetic stator structure 106 operates to selectively provide a torque on the shaft fairing 42. The magnetic shear is proportional to the electrical current flowing through the electromagnetic stator structure 106, hence the shear can be rapidly and accurately controlled by control of a current therethrough.

Figure 4E:
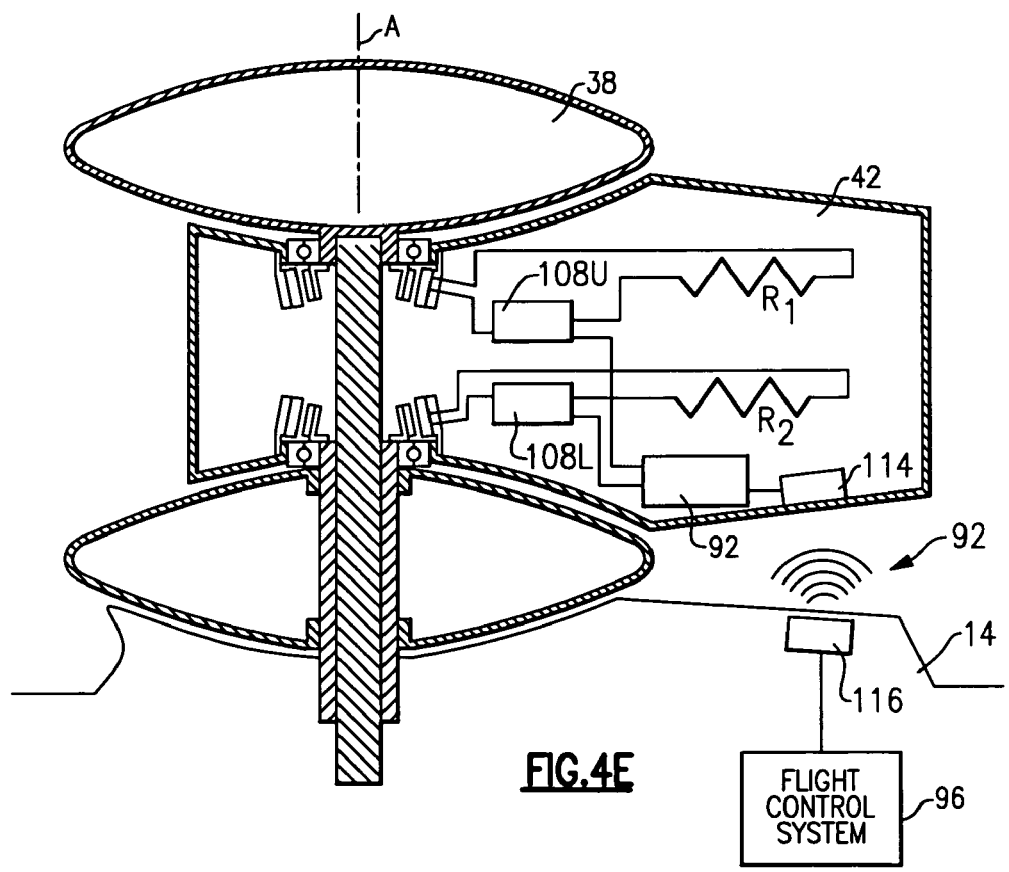
FIG. 4E is a schematic view of a control system for the active de-rotation system.

Referring to FIG. 4E, each electromagnetic torque generator 98U, 98L is in electrical communication with a respective upper and lower current control 108U, 108L that communicates with the controller 92. The controller 92 incorporates the logic for control of the shaft fairing 42. The control system 92 preferably communicates with the flight control system 96 (illustrated schematically) to command the upper current control 108U and the lower current control 108L.

The control system 92 is in electrical communication with an azimuthal position sensor 114 located within the shaft fairing 42. The azimuthal position sensor 114 preferably communicates wirelessly with a reference transmitter 116 located within the airframe 14. The sensor 114 and transmitter 116 preferably provides a signal proportional to the separation therebetween. The signal may preferably be essentially monotonic with angular displacement of the shaft fairing 42 so that displacements from a predetermined reference position in a first direction is positive while displacements in the opposite direction negative. The signal transmitted from transmitter 116 may be, for example only, a high-frequency electromagnetic wave field, spatially varying in amplitude (and preferentially in amplitude and frequency) to provide the spatial changes required for the sensor 114 to produce the monotonic signal. It should be understood that the "electromagnetic wave field" may include a variety of fields includes a light field, hence an optical sensor (including an optical sensor observing a pre-selected pattern painted directly on the fuselage) will be usable with the present invention. Most preferably, the part of the current generated by the electromagnetic torque generator 98U, 98L may be utilized to power the control system 108.

In operation, the control system 92 may selectively dissipate the electric power produced by one of the electromagnetic torque generators 98U, 98L through a respective resistive element R1, R2 such that a differential magnetic shear force is generated between the electromagnetic torque generators 98U, 98L. That is, the resistive element R1, R2 selectively absorbs a portion of the magnetic shear force produced by the respective electromagnetic torque generators 98U, 98L.

The differential magnetic shear force causes the shaft fairing 42 to rotate with whichever electromagnetic torque generator 98U, 98L that is providing the relatively greater force. That is, the difference in torque generated by the upper and lower electromagnetic torque generators 98U, 98L results in a net torque that acts to rotate the shaft fairing 42 about the axis of rotation A. The control system 92 incorporates logic for shaft fairing 42 control and supplies the control signal to the upper current control 108U and a lower current control 108L in response to the signal generated by the sensor 114.

Figure 5:
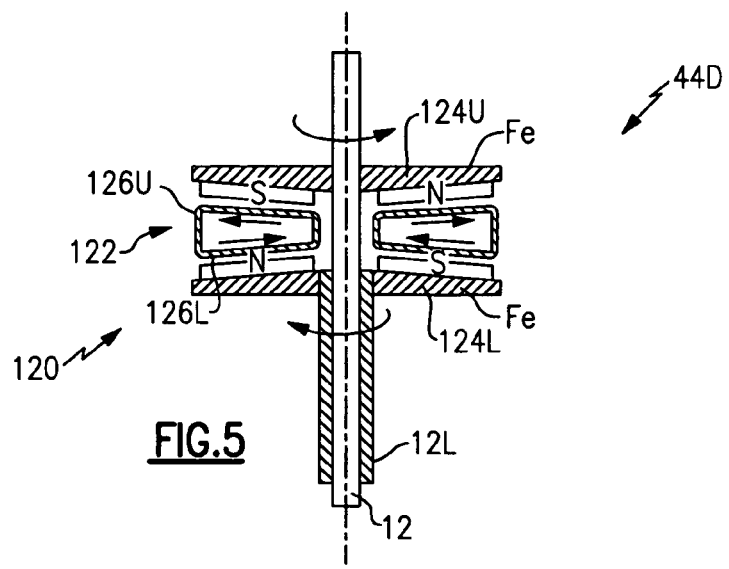
FIG. 5 is a schematic view of another active de-rotation system with a common central stator.

Referring to FIG. 5, another de-rotation system 44D includes a single electromagnetic torque generator 120 with a common central stator 122 between an upper electromagnetic rotor disk 124U and a lower electromagnetic rotor disk 124L. The electric current through an upper layer 126U and a lower layer 126L of the common central stator 122 are in opposite directions so that the generated electromagnetic torques acting on the upper electromagnetic rotor disk 124U and the lower electromagnetic rotor disk 124L are also in opposite directions. As only a single current controller is required, a relatively less complicated system is achieved.

It should be understood that relative positional terms such as "forward," "aft," "upper," "lower," "above," "below," and the like are with reference to an illustrated attitude of the structure and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fairing system comprising:
a shaft fairing mounted for rotation about an axis of rotation;
a de-rotation system mounted to said shaft fairing to control a rotation of said shaft fairing about said axis of rotation;
an upper hub fairing defined about said axis; and
a lower hub fairing defined about said axis, said shaft fairing mounted for relative movement between said upper hub fairing and said lower hub fairing.

2. A fairing system comprising:
a shaft fairing mounted for rotation about an axis of rotation; and a de-rotation system mounted to said shaft fairing to control a rotation of said shaft fairing about said axis of rotation,
a housing mounted to said shaft fairing;
a gear train supported by said housing;
an upper belt engaged with said gear train and an upper drive member which rotates about said axis of rotation; and
a lower belt engaged with said gear train and a lower drive member which rotates about said axis of rotation in a direction opposite said upper drive member.

3. The system as recited in claim 2, wherein said gear train further comprises:
an upper pulley engaged with said upper belt;
an upper gear mounted for rotation with said upper pulley;
a lower pulley engaged with said lower belt;
a lower gear mounted for rotation with said lower pulley; and
an idler gear meshingly engaged with said upper gear and said lower gear.

4. The system as recited in claim 3, wherein said upper pulley and said lower pulley are rotatable about a first gear train axis of rotation generally parallel to said axis of rotation, said idler gear defined about a second gear train axis of rotation generally transverse to said first gear train axis of rotation.

5. The system as recited in claim 3, wherein said upper belt is engaged with said upper pulley and said upper drive member, and said lower belt is engaged with said lower pulley and said lower drive member through a frictional force which provides self-aligning of the shaft fairing above a predetermined airspeed.

6. A rotor hub fairing system for a counter rotating coaxial rotor system comprising:
an upper hub fairing defined about a rotor axis of rotation;
a lower hub fairing defined about said rotor axis of rotation;
a shaft fairing mounted between said upper hub fairing and said lower hub fairing for rotation about said rotor axis of rotation;
a passive de-rotation system mounted to said shaft fairing to minimize uncontrolled rotation of said shaft fairing about said axis of rotation.

7. The system as recited in claim 6, wherein said de-rotation system comprises:
a housing mounted to said shaft fairing;
an upper belt engaged with said gear train and an upper drive member which rotates about said axis of rotation;
a lower belt engaged with said gear train and a lower drive member which rotates about said axis of rotation in a direction opposite said upper drive member
an upper pulley mounted for rotation relative said housing, said upper pulley engaged with said upper belt;
an upper gear mounted for rotation with said upper pulley;
a lower pulley mounted for rotation relative said housing, said lower pulley engaged with said lower belt;
a lower gear mounted for rotation with said lower pulley; and
an idler gear mounted for rotation relative said housing, said idler gear meshingly engaged with said upper gear and said lower gear.

\* \* \* \* \*

UNITED STATES PATENT AND TRADEMARK OFFICE
CERTIFICATE OF CORRECTION

| | | |
|---|---|---|
| PATENT NO. | : 7,621,480 B2 | Page 1 of 1 |
| APPLICATION NO. | : 11/432875 | |
| DATED | : November 24, 2009 | |
| INVENTOR(S) | : Darrow, Jr. et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 49 days.

Signed and Sealed this

Fourteenth Day of December, 2010

David J. Kappos
*Director of the United States Patent and Trademark Office*